(12) United States Patent
Shinde et al.

(10) Patent No.: US 8,834,701 B2
(45) Date of Patent: Sep. 16, 2014

(54) ELECTROCHEMICAL PROCESS FOR SYNTHESIS OF GRAPHENE

(75) Inventors: Dhanraj Bhagwanrao Shinde, Maharashtra (IN); Vijaymohanan Kunjikrishnan Pillai, Maharashtra (IN)

(73) Assignee: Council of Scientific & Industrial Research, Maharashtra (IN)

( * ) Notice: Subject to any disclaimer, the term of this patent is extended or adjusted under 35 U.S.C. 154(b) by 3 days.

(21) Appl. No.: 13/822,402

(22) PCT Filed: Sep. 13, 2011

(86) PCT No.: PCT/IN2011/000623
§ 371 (c)(1),
(2), (4) Date: Mar. 12, 2013

(87) PCT Pub. No.: WO2012/035551
PCT Pub. Date: Mar. 22, 2012

(65) Prior Publication Data
US 2013/0175182 A1      Jul. 11, 2013

(30) Foreign Application Priority Data
Sep. 14, 2010   (IN) .......................... 2176/DEL/2010

(51) Int. Cl.
*C25B 1/00*        (2006.01)
*C01B 31/04*       (2006.01)
*B82Y 40/00*       (2011.01)
*B82Y 30/00*       (2011.01)

(52) U.S. Cl.
CPC .............. *C01B 31/0438* (2013.01); *B82Y 40/00* (2013.01); *C01B 31/0446* (2013.01); *C25B 1/00* (2013.01); *B82Y 30/00* (2013.01)
USPC ........................................................ 205/555

(58) Field of Classification Search
USPC ........................... 205/220, 230, 317, 333, 555
See application file for complete search history.

(56) References Cited

U.S. PATENT DOCUMENTS

2007/0074601 A1*   4/2007   Hong et al. ..................... 75/345
2010/0105834 A1    4/2010   Tour et al.

FOREIGN PATENT DOCUMENTS

JP        2009-196840          9/2009

OTHER PUBLICATIONS

Kosynkin et al., "Longitudinal Unzipping of Carbon Nanotubes to Form Graphene Nanoribbons", Nature (Apr. 16, 2009), vol. 458, pp. 872-877.*
Kim et al., "Graphene Nanoribbons Obtained by Electrically Unwrapping Carbon Nanotubes", American Chemical Society Nano (no month, 2010), vol. 4, No. 3, 1362-1366.*
Guo, et al., "A Green Approach to the Synthesis of Graphene Nanosheets", ACS Nano, vol. 3, No. 9 (2009) 2653-59.
Jiao, et al., "Narrow graphene nanoribbons from carbon nanotubes", Nature, vol. 458 (2009) 877-80.
Kosynkin, et al., "Longitudinal unzipping of carbon nanotubes to form graphene nanoribbons", Nature, vol. 458 (2009) 872-76.
Shao, et al., "Facile and controllable electrochemical reduction of graphene oxide and its applications", J. Mater. Chem., vol. 20 (2010) 743-48.
Shinde, et al., "Electrochemical Unzipping of Multi-walled Carbon Nanotubes for Facile Synthesis of High-Quality Graphene Nanoribbons", JACS, vol. 133 (2011) 4168-171.

* cited by examiner

*Primary Examiner* — Edna Wong
(74) *Attorney, Agent, or Firm* — Fitzpatrick, Cella, Harper & Scinto

(57) ABSTRACT

A process for the transformation of carbon nanotubes (CNTs) to nanoribbons composed of a few layers of graphene by an electrochemical approach involving dispersing CNTs by sonication and depositing onto a conducting substrate, and oxidizing CNTs at controlled potential, followed by reduction to form graphene nanoribbons having smooth edges and fewer defects.

7 Claims, 5 Drawing Sheets

_US 8,834,701 B2_

ELECTROCHEMICAL PROCESS FOR SYNTHESIS OF GRAPHENE

FIELD OF THE INVENTION

Present invention provides an electrochemical route for the synthesis of graphene.

Present invention further relates to an electrochemical, two-step route to synthesize graphene from carbon Nanotubes (CNTs), and other hollow carbon nanostructures resulting in high yields.

BACKGROUND AND PRIOR ART OF THE INVENTION

Graphene is a flat monolayer of carbon atoms tightly packed into a two-dimensional (2D) honeycomb lattice, and is a basic building block for graphitic materials of all other dimensionalities with application in very exciting areas including integrated circuits, transistors, ultra capacitors, Li-ion batteries and bio-devices. Graphene exhibits many exciting properties, like room temperature quantum hall effect, long range ballistic transport with around ten times higher electron mobility than that in silicon, availability of charge carriers that behave as mass less relativistic quasi-particles like Dirac fermions, quantum confinement resulting in finite band gap and coulomb blockade effects, which could be useful to make many novel electronic devices in the near future. However, in order to fully realize the above properties and applications, consistent, reliable and inexpensive methods of growing high quality, graphene layers in good yields are crucial, as the existence of residual defects will heavily impact their electronic properties, despite their expected "insensitivity to impurity scattering".

Reported techniques for the synthesis of graphene such as mechanical cleavage, silicon carbide sublimation, solvothermal synthesis, chemical vapour deposition, and plasma etching suffer from limitations such as, a) poor quality and yield (<2%) of graphene ribbons, b) formation of over oxidized and defective nanoribbons, c) substrate-dependant behavior and finally, d) difficulty of controlling both layer thickness and edge smoothness in an accurate manner.

One of the more successful approaches to date for converting MWCNT (multi-walled carbon Nanotubes) to graphene is the recent longitudinal unzipping of MWCNTs, facilitating large scale preparation of graphene ribbons.

References may be made to Journal by Kosynkin et al in Nature, Volume 458, April 2009, titled "Longitudinal unzipping of carbon nanotubes to from graphene nanoribbons" describes a solution based oxidative process for producing graphene nanoribbons by lengthwise cutting and unraveling of MWCNT's side walls.

References may be made to Journal by Jiao et al in Volume 458, April 2009, titled "Narrow graphene nanoribbons from carbon nanotubes" describe the process of making graphene by unzipping multi-walled carbon nanotubes by plasma etching of nanotubes partly embedded in a polymer film. However, these methods have several problems primarily involved with the selection of strong oxidizing agents. The choice of the chemical oxidation route has issues such as over oxidation of edges that create defect sites which hamper electronic properties of graphene. In addition the use of strong reducing agents may pose difficulties in controlling the layer thickness of graphene ribbons. More significant would be the separation and disposal problem of these reagents with respect to the environment and hazardous effluent treatment.

References may be made to patent JP2009196840, wherein inventor discloses a cutting process for CNTs, comprising: Cutting process of a carbon nanotube oxidizing electrochemically contained in a carbon electrode by impressing voltage to a carbon nanotube electrode which is immersed in electrolysis solution, and cutting carbon nanotube. Further, the process results in electrochemical oxidative scission of carbon nanotubes, the oxidation being optimally carried out at a positive electromotive force for 10 hours. The document also states that if the electromotive force is beyond 4V, a cluster like graphene structure is observed.

References may be made to an article titled "Facile and controllable electrochemical reduction of graphene oxide and its applications" by YuyanShao et al. published in Journal of Materials Chemistry, Vol. 20, pg. 743-748, 2010 relates to electrochemical reduction of graphene oxide to form graphene. Accordingly, the oxygen content is significantly decreased and the amount of $sp^2$ carbon is restored after electrochemical reduction.

References may be made to an article titled "A green approach to the synthesis of graphene nanosheets" by Guoht et al. published in ACS Nano. 2009 Sep. 22; 3 (9):2653-9. relates to the reduction of exfoliated graphene oxide to yield graphene, by applying a reducing potential of −1.5 V. The hence obtained graphene nanosheets are characterized.

References may be made to patent JP2009196840, wherein inventor discusses the electrochemical oxidation of CNTs to obtain oxidized graphene, it also teaches that if the electromotive force is beyond 4 V, a cluster like graphene structure observed. But GuoHL et al discuss electrochemical reduction of graphene oxide to graphene at −1.5 V. Also, GuoHL et al and Yuyan Shao et al start with graphite and the result of their processes is few layered graphene with uncontrolled layer thickness.

Thus it is observed that prior at documents combine processes such as chemical oxidation and reduction or chemical oxidation with electrochemical reduction to result in graphene, but with poor yields and poor characteristics. Also, in many of these cases graphite in either its exfoliated or pristine form is the starting compound.

It is surprising to note that there are no prior arts that each a process for synthesis of graphene with rich yields or that which results in graphene in various physical forms of uniform layer thickness starting with single, double or multi-walled carbon nanotubes.

Hence, an accurate control of the quality of graphene layers along with the preparation in good yields is an unresolved need in the art.

OBJECTIVE OF THE INVENTION

Main objectives of the present invention is to synthesize high quality graphene nanoribbons by a two step electrochemical process wherein, the first step involves oxidative unzipping of carbon nanotubes in order to break down their cylindrical structure.

Another objective is to transform cylindrical carbon nanotubes to graphene nanoribbons with a control on the chemical functionality using reduction either chemically or electrochemically in the second step.

Yet another objective is to transform different types of carbon nanotubes like single walled, double walled and multiwalled to a graphene nanoribbons.

SUMMARY OF INVENTION

Accordingly, the present invention provides an electrochemical process for the synthesis of graphene comprising the steps of:

i. dispersing carbon nanotubes (CNTs) in ethanol by sonication followed by deposition onto conducting substrate by dip coating, spin coating or brush coating;
ii. oxidizing CNTs as obtained in step (i) selectively in conducting solution by applying a positive potential for period in the range of 4 to 12 hrs to obtain CNT oxide;
iii. reducing CNT oxide as obtained in step (ii) completely by applying negative potential for period in the range of 4 to 12 hrs to obtain graphene with a yield of 6 to 7%.

The above electrochemical process, wherein CNTs used are selected from the group consisting of single walled, double walled and multi walled.

In an embodiment of the present invention, conducting substrate used is selected from the group consisting of glassy C, Pt or Au.

In another embodiment of the present invention, conducting solution used is polar or non polar.

In yet another embodiment of the present invention, conducting solution used is selected from the group consisting of 0.5M sulphuric acid, KOH or acetonitrile with Li perchlorate.

In yet another embodiment of the present invention, conducting solution used is selected from ionic Liquids, polymer electrolyte or polymer electrolyte with inorganic salts selected from $LiAsF_6$, $LiPF_6$ or $LiBF4$.

In yet another embodiment of the present invention, graphene is in the form of ribbons, layers, scrolls, flowers and urchins with less defects and more uniform layer thickness.

In yet another embodiment of the present invention, positive and negative potentials are in the range of 0.5 to 0.8V and –0.5 to –0.7 V respectively.

BRIEF DESCRIPTION OF THE FIGURES

FIG. 2 shows performed X-ray analysis to investigate the structure of oxidized MWCNT. The position of graphitic (002) peak indicates the extent of oxidation. The pristine MWCNT having 2⊖ value at 26.2° corresponds to d spacing 3.31 A° whereas partially Oxidized MWCNT shows small peaks at 14.83A° and 16.7 A° respectively corresponding to the shifting of (002) plane to 22.9° by holding anodic potential at 0.77 V for 4 hours. The predominant peak at 10.08° corresponding to a d spacing of 8.4 A°, with minimal signal contributed by MWCNT (2⊖ =26.2°) suggests a considerably larger d spacing (3.31 A°) perhaps due to intercalated water and $SO_4^-$ species between the layers. This exfoliated MWCNT is electrochemically reduced in the second step where, the diffraction peak at 26.6° is very similar to that of chemically reduced MWCNT oxide.

DETAILED DESCRIPTION OF INVENTION

In accordance with the objective of synthesizing graphene by an electrochemical route, the inventive process comprises:
a. Contacting/putting CNTs on a conducting surface to form an electrode;
b. Immersing in a conducting solution with suitable composition of ions,
c. Immersing a second inert electrode as a counter or auxiliary electrode;
d. Applying an electric field at a finite positive potential to obtain oxidized CNT and e. Reducing oxidized CNT in the same/separate electrolytic solution with another potential window to obtain graphene.

In an embodiment of the invention, the electrochemical process of synthesizing graphene comprises:
1. Dispersing CNTs in ethanol by sonication followed by deposition onto conducting substrate by dip coating, spin coating and brush coating;
2. Carrying out selective oxidation by applying a positive potential for different time periods to convert CNT to CNT oxide.
3. Carrying out complete reduction of CNT oxide of step (2) to form graphene by applying negative potential for different times to obtain with a yield of 6 to 7%.

The CNTs of the invention are single walled, double walled, triple or and multi walled.

The conducting surface comprises a substrate such as glassy C, metals such as Pt, Au, or indium tin oxide coated glass on which CNTs are deposited by known methods.

The conducting solution is aqueous or non aqueous, selected from, but not limited to sulphuric acid, KOH, acetonitrile with Li perchlorate, it may also be ionic liquids or polymer electrolyte with or without such inorganic salts like $LiAsF_6$, $LiPF_6$, or $LiBF_4$.

Figure 3:
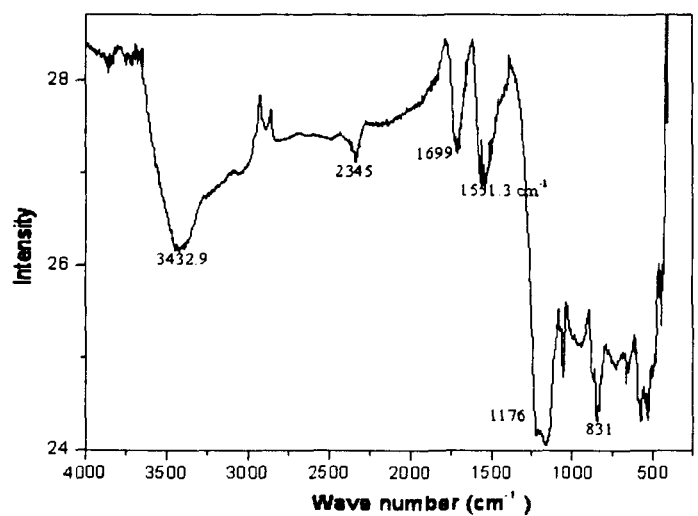
FIG. 3 represents IR spectrum for oxidation of MWCNT. IR data supports the oxidation as 1699 $cm^{-1}$ corresponds to C=O Stretching and 3432 $cm^{-1}$ confirms the presence of —OH group. The spectrum of MWCNT oxide illustrates O—H (carboxyl)) at 1395 $cm^{-1}$. O—H (broad coupling _(O_H)) at _3432 $cm^{-1}$ originated from carboxylic acid, while the band at ca. 3440 $cm^{-1}$ could be due to the O—H stretching mode of intercalated water), C—O (_(epoxy or alkoxy)) at 1176 $cm^{-1}$, stretching bands remain. As the exfoliated GO is electrochemically reduced, the adsorption bands of oxygen functionalities disappear (carboxyl groups are considerably decreased, also found in pristine MWCNT) and only the peak at 1551 $cm^{-1}$ remains, which is similar to that of pristine MWCNT, demonstrating that high purity of graphene can be achieved by using the electrochemical approach.
Figure 4:
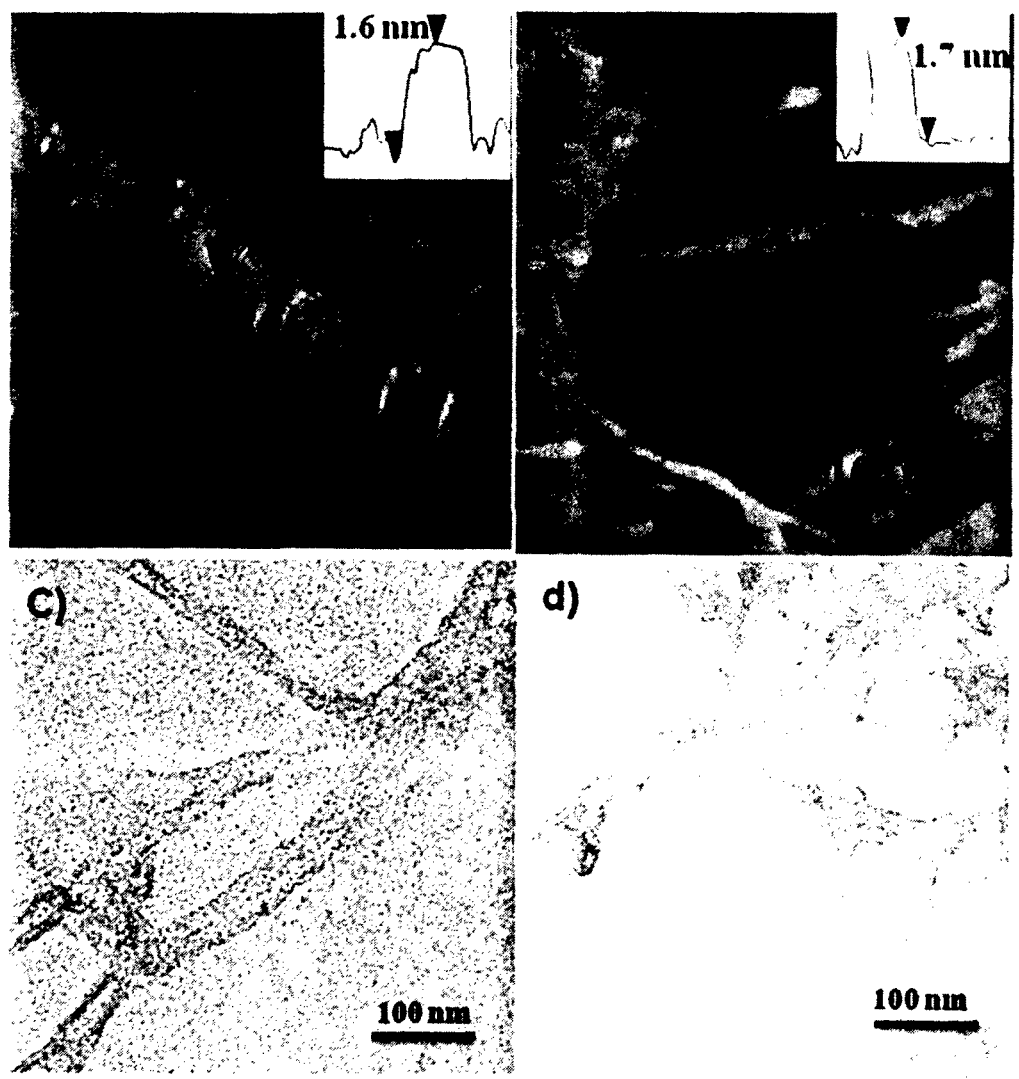
FIG. 4 represents HRTEM images of MWCNT after electrochemical treatment a) complete transformation of MWCNT to two-four layer graphene sheets. b) Along with few layer graphene ribbons sample also contains few broken MWCNT tubes. HR-TEM image clearly shows a complete transformation of 50-70 nm diameter MWCNT to few layer graphene ribbons having dimensions like 90 nm wide and few microns length. Also FIG. 5b) not shown) shows few broken MWCNT along with graphene ribbons which may be due to the incomplete oxidation of MWCNT or Some MWCNT could have been attached to the inactive surface of Glassy carbon electrode. The mechanism for cutting of MWCNT in particular direction involves the oxidative opening in preferential direction controlled by the electric field.

Optionally salts with conducting ions are used to prepare a concentration of the electrolyte in the range of 0.01 to 10 M. The process of the invention yielded 6-7% graphene. The graphene yielded is in the form of ribbons, layers, scrolls, flowers and such like in highly pure form as evidenced form the IR spectra of FIG. 3.

The oxidation and reduction potentials are varied and the yield is dependent on the potential. The time for application of potentials is also varied yielding graphene of different yields.

Figure 1:
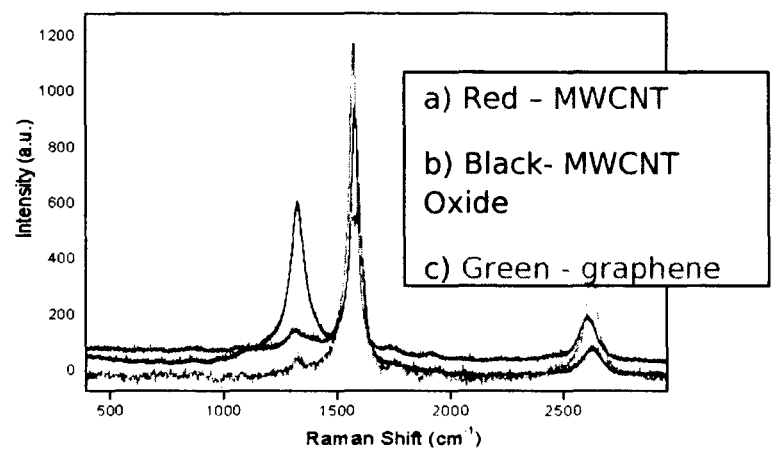
FIG. 1 represents Raman Spectra of MWCNT (a) MWCNT oxide (b) and graphene (c). G band is usually assigned to the $E_{2g}$ phonon of C $sp^2$ atoms while D band intensity corresponds to the extent of defects in CNT. At the same time, intensity of the D band at 1329 $cm^{-1}$ of exfoliated MWCNT increases substantially, indicating the decrease in size of the in-plane $sp^2$ domains, possibly due to the extensive oxidation. As seen in the pristine MWCNT, the intensity of D band is very less, suggesting high quality of the starting materials. After electrochemical oxidation, intensity of D band enhances considerably while the intensity of G band comes down clearly revealing that the oxidation has been completed. By applying controlled cathodic potential, oxidized broken graphene ribbons get converted to graphene. The Intensity ratio of D/G bands for electrochemically unzipped MWCNT is found to be 0.1 which is very low suggesting that the edges in Graphene are very sharp and defect free. Moreover the intensity of the 2D peak is found to be 60% to that of G peak which confirms the formation of bi-layer to few layer graphene.
Figure 2:
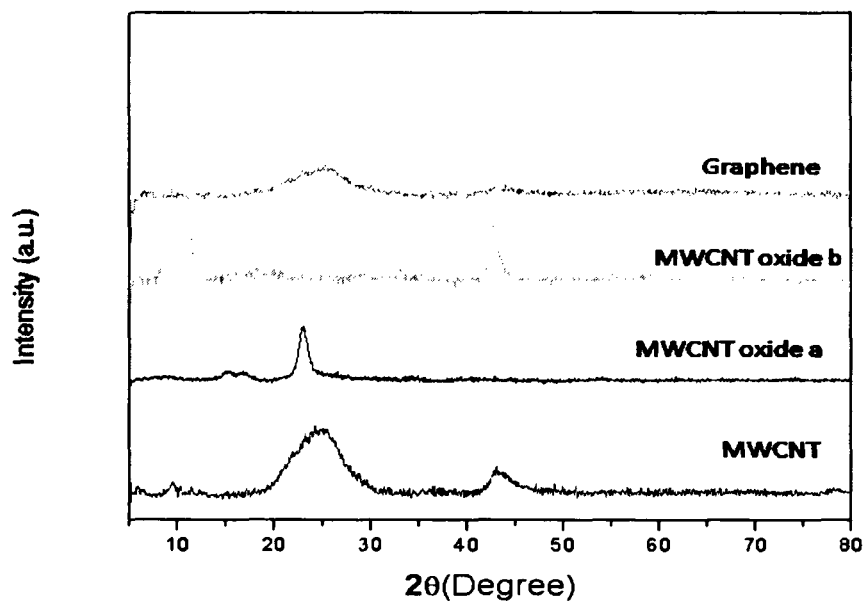
FIG. 2 represents XRD pattern of MWCNT, MWCNT oxide and graphene.
Figure 5:
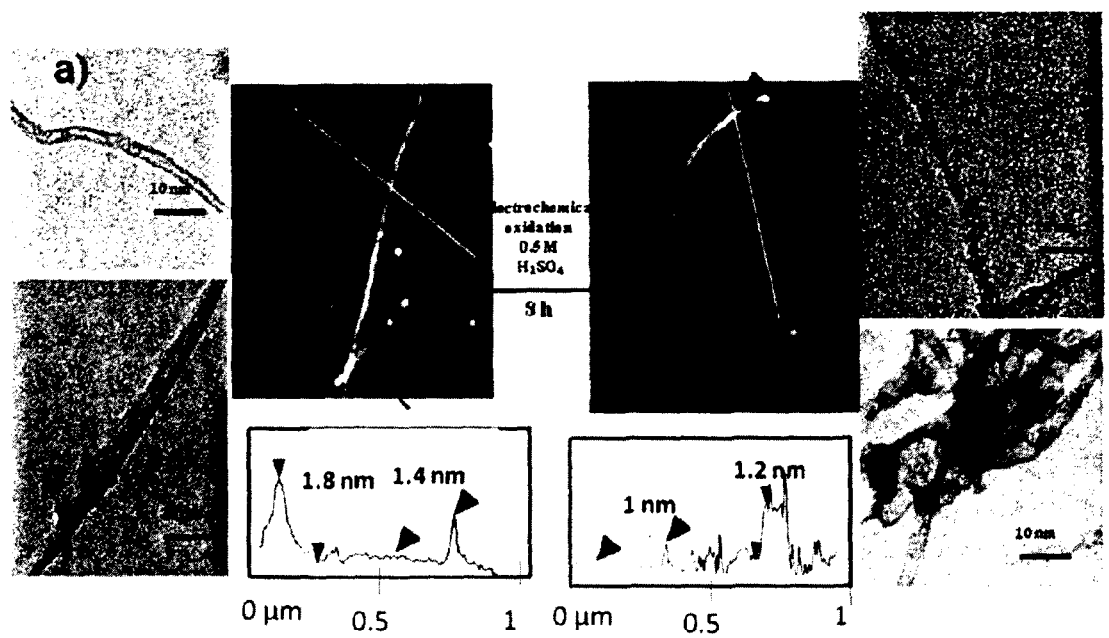
FIG. 5 represents typical TEM and AFM images of SWCNT b) after electrochemical oxidation show height difference and partially unzipped tubes (screw like nanoribbons).
Figure 6:
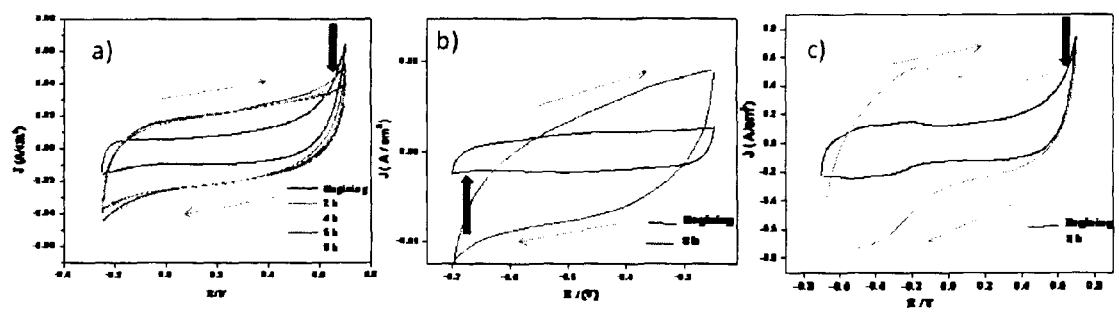
FIG. 6: a) Cyclic Voltammograms (oxidation) of SWCNTs in the potential window from –0.2 to 0.7 V vs. Quasi reference electrode in 0.5 M KOH using a glassy carbon electrode at 100 mV/s scan rate b) Cyclic Voltammograms (reduction) of SWCNTs in the potential window of 0.02 to –0.7 V vs. Quasi reference electrode in 0.5 M KOH at 100 mV/s scan rate. C) Cyclic voltammograms of SWCNTs in the potential window from –0.7 V to 0.7 V showing improved capacitance after selective electrochemical oxidation at potential 0.7 V for 8 h.
Figure 7:
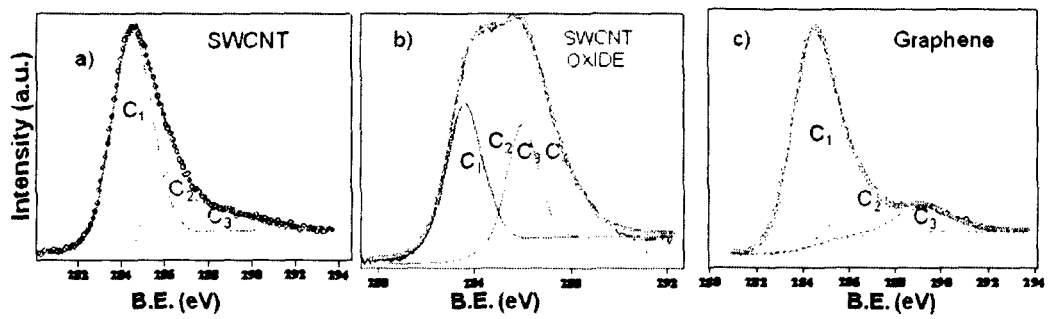
FIG. 7 represents X-ray photoelectron spectra of C is core level of A) SWCNT B) SWCNT oxide and C) Graphene; the circles represent the experimental data, thick lines represent the fitting data for overall signal and the dashed lines are the de-convoluted individual peaks for different environments of carbon.

The graphene thus produced by the process of the invention results in defect free form as evidenced from FIG. 1, FIG. 5 shows defect-free graphene as the width of graphene in this image undoubtedly corresponds to height before electrochemical cutting.

EXAMPLES

The following examples are given by way of illustration only and therefore should not be constrained to limit the scope of the present invention.

Example 1

10 mg of SWCNT (99% pure, Aldrich Company) was added to 20 ml of ethanol and 5 µl of 0.1% of Nafion (as binder). This solution was sonicated for 15 minutes to get complete dispersion. This was subsequently deposited onto conducting substrate, a glassy carbon electrode (GCE). Before the deposition, the glassy carbon electrode was polished with alumina powder, rinsed thoroughly in acetone, and finally dried. The deposition procedure involves spreading of a 5 µl portion on this pretreated bare GCE using a micropipette tip. This GCE was allowed to dry in an inert atomospere for 1 hour to form a thin uniform layer of CNT. The electrochemical oxidation of CNT was carried out in a three-electrode system (Pt as counter electrode, saturated Mercury Mercurous Sulphate as reference electrode) with the help of a dc power supply at fixed positive potential of 0.5, V for different periods such as 4, 8, 12 hours in 0.5 M $H_2SO_4$ The extent of oxidation was confirmed by various characterization techniques like XRD, XPS, Raman spectroscopy. In the second step of experiments, the CNT oxide were reduced for different periods such as 4, 8, 12 hours at fixed negative potentials of –0.5 V, so as to get layers of graphene ribbons as tabulated herein.

Example 2

10 mg of MWCNT (99% pure, Aldrich Company) was added to 20 ml of ethanol and 5 µl of 0.1% of Nafion (as binder). This solution was sonicated for 15 minutes to get complete dispersion. A portion from this was subsequently deposited onto a conducting substrate, a glassy carbon electrode (GCE). Before the deposition, the glassy carbon electrode was polished with alumina powder, rinsed thoroughly in acetone, and finally dried. The deposition procedure involves spreading of a 5 µl portion on this pretreated bare GCE using a micropipette tip. This GCE was allowed to dry in an inert atomospere for 1 hour to form a thin uniform layer of CNT. The electrochemical oxidation of CNT was carried out in a three-electrode system (Pt as counter electrode, saturated Mercury Mercurous Sulphate as reference electrode) with the help of a dc power supply at fixed positive potential of 0.6 V for different periods such as 4, 8, 12 hours in 0.5 M $H_2SO_4$. The extent of oxidation was confirmed by various characterization techniques like XRD, XPS, Raman spectroscopy. In the second step of experiments, the CNT oxide were reduced for different periods such as 4, 8, 12 hours at fixed negative potentials of –0.5, –0.6 and –0.7 V, so as to get layers of graphene ribbons as tabulated herein.

Example 3

10 mg of DWCNT (99% pure, Aldrich Company) was added to 20 ml of ethanol and 5 µl of 0.1% of Nafion (as binder). This solution was sonicated for 15 minutes to get complete dispersion. This was subsequently deposited onto conducting substrate, a glassy carbon electrode (GCE). Before the deposition, the glassy carbon electrode was polished with alumina powder, rinsed thoroughly in acetone, and finally dried. The deposition procedure involves spreading of a 5 µl portion on this pretreated bare GCE using a micropipette tip. This GCE was allowed to dry in an inert atomospere for 1 hour to form a thin uniform layer of CNT. The electrochemical oxidation of CNT was carried out in a three-electrode system (Pt as counter electrode, saturated Mercury Mercurous Sulphate as reference electrode) with the help of a DC power supply at fixed positive potential of 0.8 V for different periods such as 4, 8, 12 hours in 0.5 M $H_2SO_4$ The extent of oxidation was confirmed by various characterization techniques like XRD, XPS, Raman spectroscopy. In the second step of experiments, the CNT oxide were reduced for different periods such as 4, 8, 12 hours at fixed negative potentials of –0.5, –0.6 and –0.7 V, so as to get layers of graphene ribbons as tabulated herein.

TABLE 1

Table 1: Describes the process with regard to the different potentials and time being used and yields obtained.

| Time/hours (each) | Oxidation Potential (V) | Reduction potential (V) | Yield of Graphene* |
|---|---|---|---|
| 4 | 0.6 | –0.5 | 3.1% |
| 4 | 0.7 | –0.6 | 3.5% |
| 4 | 0.8 | –0.7 | 4.2% |
| 8 | 0.6 | –0.5 | 4.1% |
| 8 | 0.7 | –0.6 | 4.3% |
| 8 | 0.8 | –0.7 | 4.5% |
| 12 | 0.6 | –0.5 | 4.4% |

TABLE 1-continued

Table 1: Describes the process with regard to the different
potentials and time being used and yields obtained.

| Time/hours (each) | Oxidation Potential (V) | Reduction potential (V) | Yield of Graphene* |
|---|---|---|---|
| 12 | 0.7 | −0.6 | 4.6% |
| 12 | 0.8 | −0.7 | 4.6% |

*These yields are calculated on the basis of Raman study.

Example 4

Figure 8:
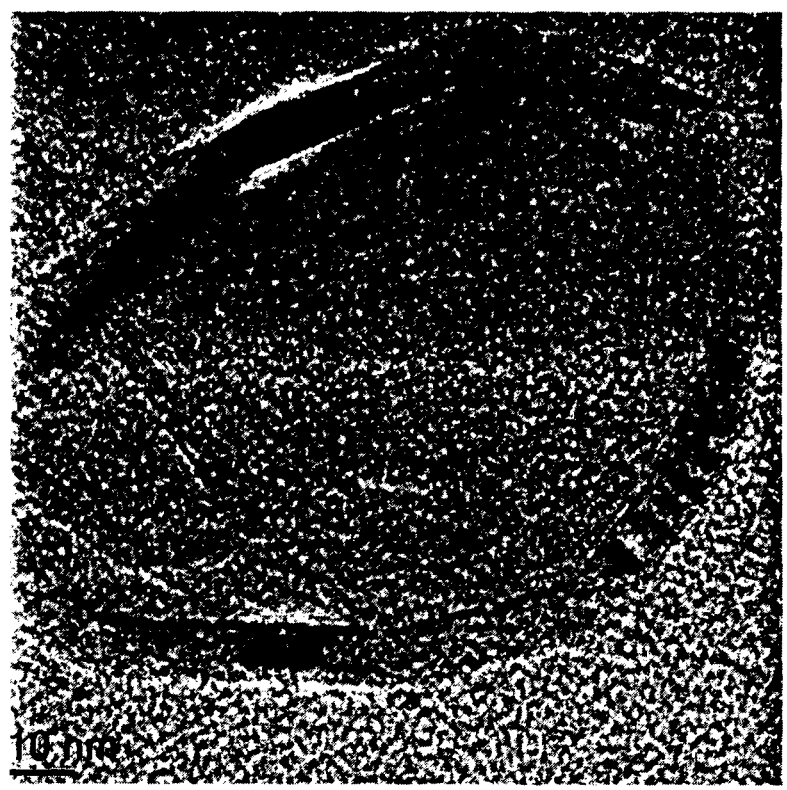
FIG. 8 shows typical TEM image of Screw like graphene from MWCNT after electrochemical oxidation and reduction in 0.5 M KOH.

10 mg of SWCNT (99% pure, Aldrich Company) was added to 20 ml of ethanol and 5 µl of 0.1% of Nafion (as binder). This solution was sonicated for 15 minutes to get complete dispersion. This was subsequently deposited onto conducting substrate, a glassy carbon electrode (GCE). Before the deposition, the glassy carbon electrode was polished with alumina powder, rinsed thoroughly in acetone, and finally dried. The deposition procedure involves spreading of a 5 µl portion on this pretreated bare GCE using a micropipette tip. This GCE was allowed to dry in an inert atmosphere for 1 hour to form a thin uniform layer of SWCNT. The electrochemical oxidation of CNT was carried out in a three-electrode system (Pt as counter electrode, Pt wire as reference electrode) with the help of a dc power supply at fixed positive potential of 0.5, V for different periods such as 4, 8, 12 hours in 0.5 M KOH. The extent of oxidation was confirmed by various characterization techniques like XRD,XPS, Raman spectroscopy. In the second step of experiments, the CNT oxide were reduced for different periods such as 4, 8, 12 hours at fixed negative potentials of −0.5 V, so as to get layers of screw like graphene nanoribbons as tabulated herein. Ref: FIG. 8.

Example 5

10 mg of MWCNT (99% pure, Aldrich Company) was added to 20 ml of ethanol and 5 µl of 0.1% of Nafion (as binder). This solution was sonicated for 15 minutes to get complete dispersion. This was subsequently deposited onto conducting substrate, a glassy carbon electrode (GCE). Before the deposition, the glassy carbon electrode was polished with alumina powder, rinsed thoroughly in acetone, and finally dried. The deposition procedure involves spreading of a 5 µl portion on this pretreated bare GCE using a micropipette tip. This GCE was allowed to dry in an inert atmosphere for 1 hour to form a thin uniform layer of CNT. The electrochemical oxidation of CNT was carried out in a three-electrode system (Pt as counter electrode, pt wire as reference electrode) with the help of a dc power supply at fixed positive potential of 0.8 V for different periods such as 4, 8, 12 hours in 0.5 M $H_2SO_4$. The extent of oxidation was confirmed by various characterization techniques like XRD, XPS, Raman spectroscopy. In the second step of experiments, the CNT oxide were reduced for different periods such as 4, 8, 12 hours at fixed negative potentials of −0.5, −0.6 and −0.7 V, so as to get layers of screw like graphene as tabulated herein.

SWCNT and MWCNT in the acidic media (0.5 M $H_2SO_4$) using conducting substrate (glassy carbon electrode, pt and Au) giving graphene nanoribbons. While SWCNT and MWCNT in basic media (0.5 M KOH) using different conducting substrates (glassy carbon, Pt and Au) giving screw like morphology of graphene.

ADVANTAGES OF THE INVENTION

1) In our method the quality of graphene nanoribbons (Conductivity and mobility measurement) is significantly better as compared to other synthesis approaches because some of the limitations of other methods like over-oxidation and edge defects are not there in electrochemical methods.
2) Electrochemical oxidation can ensure accurate control of degree and site of oxidation, and advantages of tuning the orientation and planes along the length so that this method offers graphene nanoribons with less defects compared to other chemical methods.
3) Similarly, both edge smoothness and layer thickness can be controlled in a predictable manner in our method.

We claim:

1. An electrochemical process for the synthesis of graphene comprising the steps of:
   i. dispersing carbon nanotubes (CNTs) in ethanol by sonication followed by deposition onto a conducting substrate by dip coating, spin coating or brush coating, said CNTs being selected from the group consisting of single walled, double walled and multi walled CNTs;
   ii. oxidizing CNTs as obtained in step (i) selectively in a conducting solution by applying a positive potential for a period in the range of 4 to 12 hrs to obtain CNT oxide; and
   iii. reducing CNT oxide as obtained in step (ii) completely by applying a negative potential for a period in the range of 4 to 12 hrs to obtain graphene with a yield of 6 to 7%.

2. The electrochemical process as claimed in claim 1, wherein the conducting substrate is selected from the group consisting of glassy C, Pt and Au.

3. The electrochemical process as claimed in claim 1, wherein the conducting solution is polar or non polar.

4. The electrochemical process as claimed in claim 3, wherein the conducting solution is selected from the group consisting of 0.5M sulphuric acid, KOH and acetonitrile with Li perchlorate.

5. The electrochemical process as claimed in claim 3, wherein the conducting solution is selected from the group consisting of ionic liquids, polymer electrolyte and polymer electrolyte with inorganic salts selected from the group consisting of $LiAsF_6$, $LiPF_6$ and $LiBF_4$.

6. The electrochemical process as claimed in claim 1, wherein the graphene obtained in step (iii) is in the form of ribbons, layers, scrolls, flowers and urchins with less defects and more uniform layer thickness.

7. The electrochemical process as claimed in claim 1, wherein positive and negative potentials in steps (ii) and (iii) are in the ranges of 0.5 to 0.8V and −0.5 to −0.7 V respectively.

* * * * *